(12) United States Patent
Chia et al.

(10) Patent No.: US 11,876,335 B2
(45) Date of Patent: Jan. 16, 2024

(54) METHOD AND SYSTEM TO SIMULTANEOUSLY GENERATE TUNABLE REDSHIFT AND BLUESHIFT FEMTOSECOND LASER PULSES WITH ADJUSTABLE SPECTRAL BANDWIDTH AND OUTPUT POWER

(71) Applicant: National Yang Ming Chiao Tung University, Taipei (TW)

(72) Inventors: Shih-Hsuan Chia, Taipei (TW); Lu-Ting Chou, Taipei (TW); Dong-Lin Zhong, Taipei (TW)

(73) Assignee: NATIONAL YANG MING CHIAO TUNG UNIVERSITY, Taipei (TW)

( * ) Notice: Subject to any disclaimer, the term of this patent is extended or adjusted under 35 U.S.C. 154(b) by 163 days.

(21) Appl. No.: 17/518,080

(22) Filed: Nov. 3, 2021

(65) Prior Publication Data
US 2023/0140440 A1    May 4, 2023

(51) Int. Cl.
| H01S 3/10 | (2006.01) |
| H01S 3/00 | (2006.01) |
| H01S 3/067 | (2006.01) |
| H01S 3/102 | (2006.01) |
| H01S 3/16 | (2006.01) |

(Continued)

(52) U.S. Cl.
CPC .......... *H01S 3/0057* (2013.01); *H01S 3/0092* (2013.01); *H01S 3/06725* (2013.01); *H01S 3/06741* (2013.01); *H01S 3/1024* (2013.01); *H01S 3/067* (2013.01); *H01S 3/0941* (2013.01); *H01S 3/094053* (2013.01); *H01S 3/1618* (2013.01)

(58) Field of Classification Search
CPC .. H01S 3/0057; H01S 3/0092; H01S 3/06725; H01S 3/06741; H01S 3/1024; H01S 3/067; H01S 3/094053; H01S 3/0941; H01S 3/1618
See application file for complete search history.

(56) References Cited

U.S. PATENT DOCUMENTS

| 7,711,013 | B2 * | 5/2010 | Liu | ........................ | H01S 3/0014 |
| | | | | | 372/9 |
| 8,902,939 | B2 * | 12/2014 | Kafka | .................. | G01N 21/359 |
| | | | | | 372/20 |

(Continued)

*Primary Examiner* — Kinam Park
(74) *Attorney, Agent, or Firm* — MUNCY, GEISSLER, OLDS & LOWE, P.C.

(57) ABSTRACT

A method and a system are provided to simultaneously generate blue-shifted and red-shifted femtosecond light sources with tunable spectral peak location and bandwidth, by controlling the input condition (chirp/spectrum) of a fiber-optic nonlinear propagation. The system comprises (A) a seed source, (B) a driving current controller to regulate the spectrum of the seed source, (C) a dispersion controller to control the chirp and pulse width of the seed source, (D) a fiber-optic spectral conversion module to shape and broaden the laser spectrum via fiber-optic nonlinear processes, and (E) a spectral selection module to filter out the required wave packets. With the simultaneous uses of the driving current controller and the dispersion controller, the light sources feature continuously tunable spectral peak with (1) a relatively constant output pulse energy or (2) a tunable spectral bandwidth at a specific peak location.

11 Claims, 9 Drawing Sheets

(51) Int. Cl.
     *H01S 3/094*      (2006.01)
     *H01S 3/0941*     (2006.01)

(56) References Cited

U.S. PATENT DOCUMENTS

| | | | | |
|---|---|---|---|---|
| 11,201,447 | B2* | 12/2021 | Xu | H01S 3/10084 |
| 2010/0054661 | A1* | 3/2010 | Ramachandran | G02F 1/3513 |
| | | | | 385/27 |
| 2011/0206073 | A1* | 8/2011 | Karavitis | H01S 3/235 |
| | | | | 372/25 |
| 2011/0210252 | A1* | 9/2011 | Ouchi | H01S 3/2308 |
| | | | | 359/337.2 |
| 2011/0280262 | A1* | 11/2011 | Fermann | H01S 3/06754 |
| | | | | 359/341.5 |

* cited by examiner

METHOD AND SYSTEM TO SIMULTANEOUSLY GENERATE TUNABLE REDSHIFT AND BLUESHIFT FEMTOSECOND LASER PULSES WITH ADJUSTABLE SPECTRAL BANDWIDTH AND OUTPUT POWER

FIELD OF THE INVENTION

A simple method and system of a fiber-based tunable femtosecond laser source relate to the fields of biomedical photonics and laser optics, applicable to any femtosecond applications with laser wavelength modification requirement, especially for biomedical imaging and material sensing.

BACKGROUND OF INVENTION

The commonly-used femtosecond tunable sources mostly comprise non-fiber solid-state laser systems. Taking Ti:sapphire-based systems, the main workhorses for ultrafast applications, as an example, widely-tunable laser source can be achieved, and a wider tuning range of 700-1300 nm can be realized with the use of optical parametric oscillators. Nevertheless, the total system price can be as high as 250,000 USD, which is mainly due to the expensive pumping source, the need of precise environmental control. Moreover, the annual maintenance fee can be as high as 30,000-50,000 USD, due to the needs of cavity fine tuning by world-class experts. Therefore, the cost of the laser systems leads to the limited development of related applications, and thus the related uses are mostly applied in fundamental researches in high-level laboratories or high unit-price products.

The Ti:sapphire laser typically requires Watt-level laser pump sources at around 532-nm wavelength with great laser quality. In addition, to build a robust free-space cavity with the capability of wavelength tuning, manufacturers have to spend a large amount of costs on the cavity design. Combined with the optical parametric oscillators, the systems become more complex and expensive, and such systems must operate in a vibration-free environment.

The fiber-based redshift tunable femtosecond laser module has been developed by applying a nonlinear effect, Raman soliton-self frequency shift, but it is only capable of continuous redshift. Although the spectral broadening from fiber-optic nonlinearity also leads to blueshift, the wavelength of the blueshift cannot be continuously tuned; a prior tunable spectrum conversion module, which simultaneously enables redshift and blueshift, has been developed by using a power controlling module and employing another nonlinear effect, self-phase modulation (SPM). Nevertheless, its use leads to a drastic difference in output power when tuning the peak wavelength, and the bandwidth of the spectral lobe cannot be controlled.

The development of bandwidth-tunable light sources is of great importance in biomedical applications and material science, and the tunability of both the wavelength peak and bandwidth enables the optimization of the signal detection (e.g., fluorescence). Different light-material interactions feature different interacting cross sections. Moreover, the responses (e.g., generation of fluorescence) in different embedded environments may be different; therefore, the capability of tuning both the spectral peak location and the bandwidth may avoid unwanted interactions (e.g., photobleaching and photodamage of fluorescence) with the optimized signal level by best fitting the target cross section.

Therefore, it is very important to develop a robust femtosecond pulse source system capable of tuning both the peak wavelength and bandwidth. In addition, the system should be modularized, cost-effective, and convenient for maintenance with a high tolerance to the environmental change (i.e., ambient temperature, humidity, and vibration).

SUMMARY OF THE INVENTION

In view of this, the tunable light source of the present invention can regulate the wavelength from the center wavelength of the driving light source (e.g., about 1,025 nm for ytterbium-doped fiber lasers) towards both longer and shorter spectral ranges; the stability and consistency of the output power sat different tuned wavelengths can be achieved by managing the chirp of the input pulse.

The present invention comprises the method and corresponding system for producing femtosecond pulses capable of tuning the spectral peak location and the bandwidth of the blueshift and redshift simultaneously with a consistent output power. The system comprises a femtosecond seed laser (femtosecond fiber laser is used as an example in this application, but any femtosecond light source is allowed), a dispersion controller, a redshift and blueshift tunable fiber-optic spectral conversion module (named the spectral conversion module in brief in the following text), and a spectral selection module. The dispersion controller manages the chirp of the seed laser, while stabilizing a light path position or/and a light spot size, so that the temporal width of the seed pulse can be controlled without changing the other input parameters of the spectral conversion module. The spectral conversion module comprises a nonlinear medium for spectral broadening, which converts the wavelength of the femtosecond optical pulses toward longer wavelength (redshift) and shorter wavelength (blueshift), and an example of the converted spectrum is shown in FIG. 2. The spectral selection module is connected to the spectral conversion module to filter out the outmost lobes of the broadened spectra, and a target spectra are shown as the spectral lobes in the square frames of the spectra in FIG. 2).

One embodiment of this method and the corresponding system is to continuously modify the wavelength outputs of the blueshift and redshift or to fix the wavelength peak to an optimal value; the output average power is an independent parameter, which is not proportional to the red-shifted/blue-shifted amounts of frequency.

In a preferred embodiment, a driving current controller is applied to the femtosecond seed laser, and one implemented function is that the output bandwidth can be an independent parameter, which doesn't link to the control of the spectral peak location. The Fourier-transform-limited pulse duration can be a target to estimate the tunable bandwidth. Under a certain output wavelength peak, the chirp from the dispersion controller must enable the larger than 10% of the variation of the Fourier-transform-limited pulse duration. The input temporal duration negatively correlates to the output pulse bandwidth, and positively correlates with the corresponding Fourier-transform-limited pulse duration and output power.

The main application scenario of this system is with the use of fiber laser systems as a femtosecond seed laser. Since it can be in all-fiber format, the light path can be easily folded with a compact size. For example, the width, the length, and the height are smaller than 1 meter. In addition, this invention uses an additional small segment of fiber as the wavelength regulation and control module, and the length, width, and height of the invented system are within 20 cm.

In the preferred embodiment, the spectral conversion module uses fiber-optic nonlinearity to generate a spectrally tunable light source based on femtosecond seed lasers: Using SPM in fiber to broaden the spectrum, in combination with filter plates to filter out the outermost lobes of the blueshift and redshift from the broadened spectrum.

In the preferred embodiment, a dispersion control unit and driving current control unit may be already included in the femtosecond seed laser, but the dispersion control unit and driving current control unit are employed to shorten the pulse width and to maximize the output power of the femtosecond seed laser only, respectively. Therefore, the two regulation and control modules, with the implementation of the output controllability, and femtosecond seed laser can be integrated into a single system, to manipulate the power and pulse width of the input pulse before the spectral conversion module. The output spectral peak location and the bandwidth can thus be controlled by varying the power and pulse width of the input pulses. In addition, the tuning of the spectral peak can be controlled by the dispersion controller only, and the only control from the dispersion controller doesn't change the input power before the spectrum conversion module, which leads to a stable output power after the spectrum selection module without the need of an additional input power stabilizer. Therefore, the system can provide a relatively compact and stable system with low maintenance needs and economic costs.

For regulation and control of the spectral peak location of the redshift and blueshift with consistent output powers, the present invention specifies the methods to control the chirp of the input pulse into the spectral conversion module, by varying the introduced dispersion via the dispersion controller: (1) The dispersion controller mainly provides group delay dispersion (GDD) to manage the temporal width and peak power of the input pulses, to realize the description [0009], and the frequency difference between the center frequency of the femtosecond seed laser and the spectral peak location of the filtered spectral lobes (the part in the dotted frame of the spectrum in FIG. 2) is roughly inversely proportional to the square of the input pulse width. (2) The tuning range of the introduced dispersion is within $1/10$ to 10 times of the square of the Fourier-transform-limited duration of the input pulse (e.g., The tuning range of the introduced GDD when using a 100 fs transform-limited pulse should be within $1/10$ to 10 times of $\pm 100$ fs$^2$). (3) The spectral lobe bandwidth (the part in the dotted frame of the spectrum in FIG. 2) can also be manipulated by the dispersion controller at different spectral peak wavelength, and it is negatively correlated to the input pulse width and the absolute value of the net GDD of the input pulse, and an example is as shown in FIG. 2 and FIG. 3 (e.g., the dispersion controller adds a net dispersion of +6000 fs$^2$, and it leads to the generation of the spectral lobe around 920-nm with the bandwidth of 50 nm, and the introduced GDD of 4200 fs$^2$ to the input pulse leads to the generation of a spectral lobe around 800 nm with 70-nm bandwidth). (4) The major function of the dispersion controller is to control the introduced GDD to the input pulse, while maintaining the position and size of the input laser beam into the spectral conversion module. However, the employment of the dispersion controller may change the introduced higher-order dispersion and the input power of the spectral conversion module.

The present invention uses a driving current controller to control the output of the femtosecond seed laser, in combination with a spectral conversion module with the following proposes: (1) The driving current controller may change the stimulated radiation of femtosecond seed light source, so as to modify the power, spectrum, and/or dispersion of the femtosecond seed laser, which leads to the manipulation of the input pulse into the spectrum conversion module. (2) When the driving current controller works as a necessary control unit, it can tune the control current to a fixed optimum working value, to achieve the description [0009] with the use of dispersion controller, or to realize the description [0010] with an additional input power controller before the spectral conversion module. (3) The uses of both the driving current controller and dispersion controller enables (i) the realization of the description [0009] with a better stabilization of the output power and (ii) the realization of the description [0010] while maintaining the spectral peak location of the output, as shown in the spectra in FIG. 9. (4) The driving current controller can be used alone as the power controller described in a prior art in [0004] to realize the description [0012], and the redshift/blueshift amounts will be positively correlated with the change of the applied current.

In a preferred embodiment, an input power stabilizer can be added before the spectral conversion module, (1) to stabilize the output pulse power or (2) to assist the dispersion controller and the driving current controller and realize the description [0010] while maintaining the spectral peak location of the output.

The present invention does not need an input power controller before the spectral conversion module, as a prior art described in [0004]. The use of the dispersion controller leads to the less variation of the input average power before the spectral conversion module, and it thus leads to the less variation of the output average powers with significantly improved stability.

In addition, the spectral symmetry between the redshift and blueshift from the description [0012] can be controlled by the third-order dispersion of the input pulse of the spectral conversion module, and the control of the third-order dispersion may optimize the redshift or the blueshift, or equalize the output power of the redshift and blueshift.

This system will be used for any application requiring pulses at specifically demanded wavelength; e.g., for the optimization of molecular excitation, and the consistency of the output power during the wavelength tuning may avoid the potential sample damage and possible biased errors in quantitative analysis. A wide tuning range of the spectral peak location can be achieved since both the rightmost and leftmost spectral lobes, as the example spectra shown in the dashed frames in FIG. 2, are tunable. The introduced dispersion amount from the dispersion controller can be managed according to the needs of different applications, and the output spectra, as the example spectra shown in FIG. 4, are confirmed by spectrometers to meet the interacting cross section of the targets. The spectral conversion module is modularized with the less need of maintenance, and it is also replaceable according to the needs of different applications, in order to optimize the output power, bandwidth, and spectral peak locations by using different nonlinear media in the spectral conversion module. An example is shown in FIG. 3: By using the NL-1050-ZERO-2 fiber with 85-fs input pulses centered at 1025 nm, the output with the peak wavelength of 920 nm (in the blueshift part) can be obtained when the net input GDD is tuned to about 6000 fs$^2$, and the application requiring this wavelength, e.g., two photon excitation of green fluorescent protein (GFP) for biomedical imaging, can be performed with the optimal excitation. For some silicon-based meta-material analysis, the generation of 1,150-nm pulses (in the redshift part) can be obtained when the net input GDD is modified to about 4,500 fs². The dispersion/driving current can be regulated to meet the needs of different applications or multiple excitation targets.

The control of the spectral bandwidth while tuning the spectral peak location was not found in the prior art, and its applications aim to further optimize the spectral responses of light and matter interactions. For example, the excitation peak of GFP is at 920 nm with an 80-nm full width at half maximum bandwidth. With the capability of tuning the bandwidth with the wavelength of the spectral peak at 920 nm, the invention provides a tool to optimize the two-photon fluorescence signal from GFP.

The present invention regulates the input temporal pulse width of the spectral conversion module, so as to modify the spectral broadening and to tune the output light wavelength. This method is also capable of improving the power inconsistency and poor output stability at different tuned wavelengths, which are the problems of wavelength tunable femtosecond pulses based on fiber-optic nonlinearity at the present stage.

The present invention achieves the following predominant features based on the dispersion controller and the driving current controller:

(1) Consistent output power at different tuned wavelengths: The method to continuously vary the input temporal width by the dispersion control reduces the correlation between the tuned wavelength and the corresponding output power. For example, with the only control from the dispersion controller, the difference between the maximum and minimum power outputs is less than 20%, as shown in FIG. 5; the output power is proportional to redshift/blueshift amount in a prior design based on a power controlling module, the difference of the output power at different tuned wavelength may be higher than 50% or even more.

(2) Stable coupling to the spectral conversion module: The fiber-optic coupling and alignment into the spectral conversion module may be sensitive to the change of the input power, which results from the disturbance of the thermal equilibrium on the fiber head. Therefore, the invention doesn't change the input average power to the spectral conversion module. In contrary, a prior design based on a power controlling module may lead to unstable fiber coupling, and the misalignment may result in damage to the spectral conversion module.

(3) More robust system: The two controllers can be easily equipped in the driving laser system. In comparison to the prior arts, which necessarily require a power controller before the spectral conversion module, this system can be more robust with the less power loss and a compact size.

(4) The spectral bandwidth of the output light source at a certain tuned wavelength can be freely modified by changing the introduced dispersion and the driving current. The change of the bandwidth at a specific wavelength leads to the efficiency optimization of the light and matter interaction, in order to meet the specific needs of applications.

DETAILED DESCRIPTION OF THE INVENTION

Embodiment 1

Figure 1:
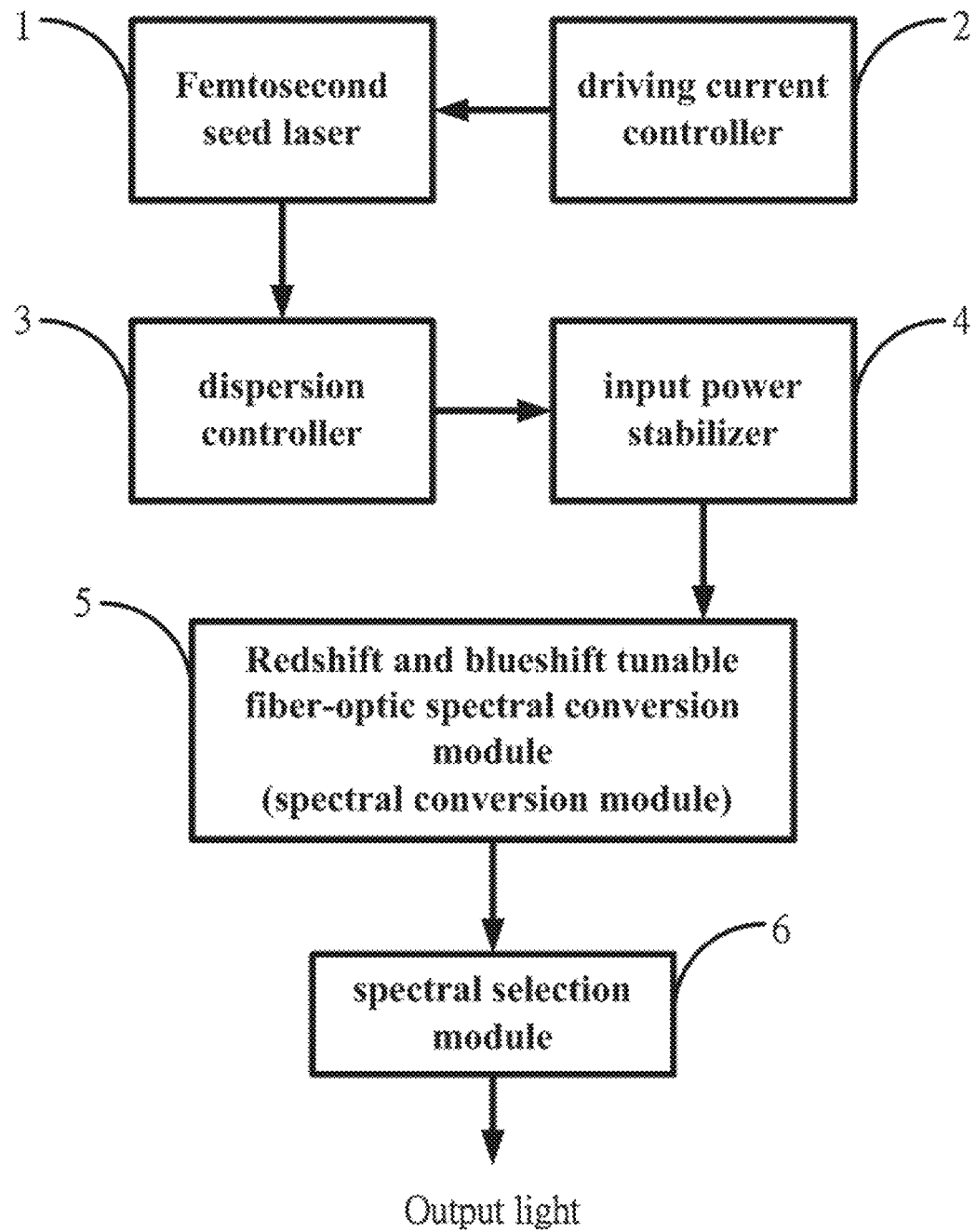
FIG. 1 Schematic diagram of femtosecond light source system with simultaneously tunable spectral redshift and blueshift and bandwidth.

A method and system to simultaneously generate tunable redshift and blueshift femtosecond pulses with adjustable spectral bandwidth and output power. A fiber-optic spectral conversion via self-phase modulation (SPM) is applied, and the invention regulates the spectral peak, the bandwidth, and power of the output, as shown in FIG. 1; the system comprises the below modules and elements:

A femtosecond seed laser 1, delivering femtosecond optical pulses;

A driving current controller 2, connected to the femtosecond seed laser 1, and the driving current controller 2 assists a dispersion controller 3, regulating the input peak power and temporal pulse shape (into a redshift and blueshift tunable fiber-optic spectral conversion module 5), so as to control an output spectrum;

The dispersion controller 3 is connected to the femtosecond seed laser 1.

Figure 2:
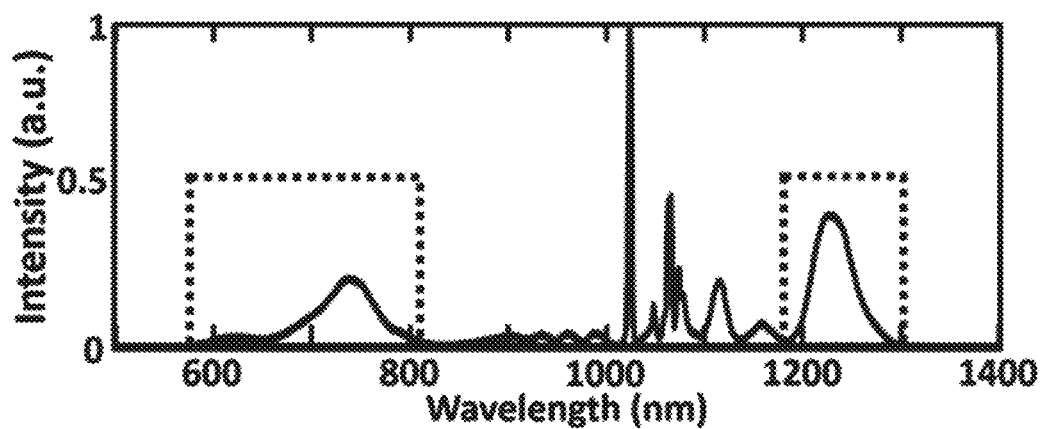
FIG. 2 Schematic diagram of self-phase-modulation-dominated output spectrum from spectral conversion module.
Figure 3:
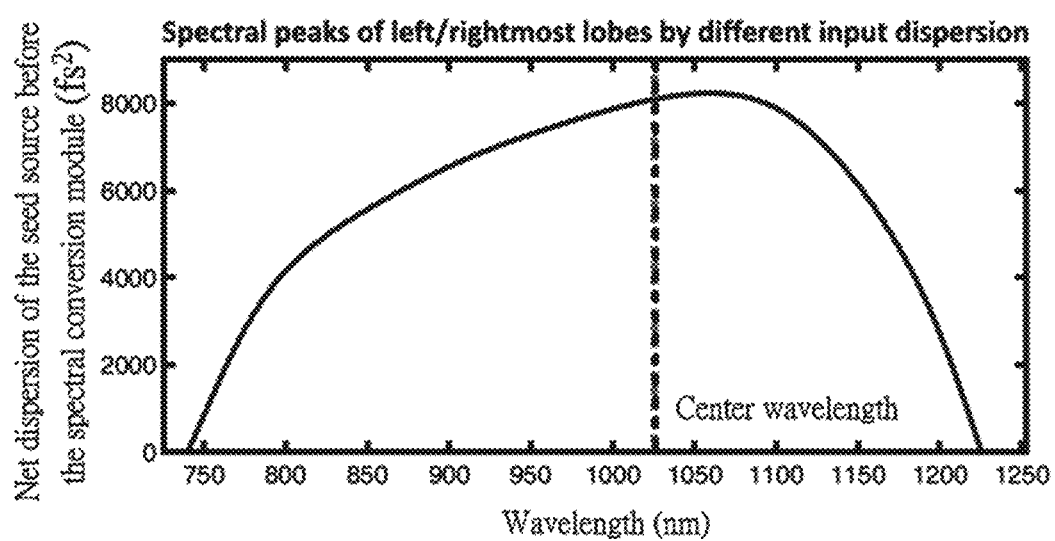
FIG. 3 Schematic diagram of spectral peak location of leftmost/rightmost lobes under different net group delay dispersion.

The dispersion controller 3 should maintain the position of the light path or/and a light spot size, and a temporal pulse width is controlled by changing the group delay dispersion (GDD) of the optical pulses, so as to control an output spectrum; An input power stabilizer 4, connected to the dispersion controller 3, and the input power stabilizer 4 can control the output spectral wavelength, power, or width in combination with the dispersion controller 3 and the driving current controller 2. The input power stabilizer 4 should also maintain the position of the light path or/and the light spot size;

The redshift and blueshift tunable fiber-optic spectral conversion module 5 (spectral conversion module) is replaceable, connected to the dispersion controller 3 and the input power stabilizer 4. The spectral conversion module 5 comprises the medium for spectral broadening, and the spectrum of femtosecond optical pulses can be converted through this module. An example output from the spectral conversion module is shown in FIG. 2. The redshift and blueshift can be tuned towards longer wavelength and shorter wavelength respectively, and the spectral peak locations after the control of the input GDD are shown in FIG. 3; and A spectral selection module 6, connected to the spectral conversion module 5, and the use of the spectral selection module 6 can isolate the outmost spectral lobes of the broadened spectra, and rejecting the light at the other wavelengths, shown as the example spectrum covered in the dotted frames in FIG. 2. The filtered spectra in FIG. 4 can be achieved with different redshift and blueshift; dark blue light 10, green light 20, yellow light 30, and red light 40.

Preferably, the femtosecond seed laser 1 comprises a femtosecond laser oscillator and possibly one or more femtosecond laser amplifiers, wherein the material of a laser gain medium includes but not limited to a solid-state crystal, an amorphous material (e.g., optical fiber), and a semiconductor material.

Preferably, the dispersion controller includes a translational stage, which can be electrically or manually controlled to adjust the distance or penetration thickness of dispersive components to tune the dispersion.

Figure 7:
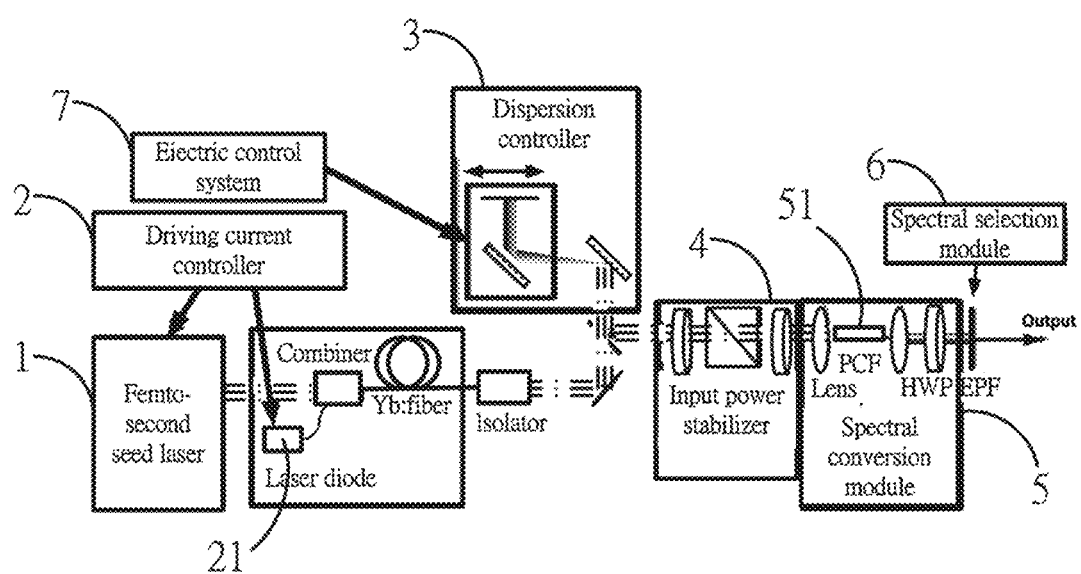
FIG. 7 Schematic diagram of embodiment.

Preferably, the dispersion controller 3 includes an electric translational stage, as shown in FIG. 7, and an electric control system 7 can be applied to control the distance between dispersion control components (e.g., using reflection or transmission grating pair, prism pair) and vary the introduced dispersion. The use of the electric translational stage enables the precise and continuous control of the introduced dispersion, so as to achieve continuously tunable output spectral lobes.

Preferably, the dispersive components used for dispersion control in the dispersion controller can be but not limited to grating pairs, prism pairs, chirped mirrors, high dispersion materials, fiber gratings, transparent materials with a variable thickness, active spatial light modulation systems, and active acousto-optic modulation systems.

Preferably, the spectral conversion module 5 comprises a light focusing optics (e.g., a lens or a concave mirror), a light path regulator, and a nonlinear medium (i.e., a piece of optical fiber), and a collimator. Wave plates and polarizers are possibly employed on the input and/or output ports of the spectral conversion module 5 to regulate the light polarization.

Preferably, the spectral selection module 6 is the combination of components for filtering out specific spectra. The combination of components includes but not limited to a single or multiple band pass, short pass, and long pass optical filter plates, a resonance tunable material, and a tunable/switchable filter holder; A position tunable slit with a specific width can also be used to select the spectra from the light with angular dispersion, obtained from a prism or/and a grating pair, to allow the transmission of a specific spectral band; a resonance tunable material can also be used.

Preferably, the spectral selection module comprises manual or/and automatic mechanics, which enables transverse or/and rotary operation to switch the filtered spectral band.

Embodiment 2

A method and system to simultaneously generate tunable redshift and blueshift femtosecond pulses with adjustable spectral bandwidth and consistent output power. Schematic diagram of the invention is shown in FIG. 1, and the steps are given below:

S1. A femtosecond seed laser 1 generates femtosecond laser pulses;

S2. A driving current controller 2 regulates the output power of the femtosecond seed laser 1, to control the output spectra of the invented system and to tune the output spectral peak, bandwidth, and the output power;

S3. The laser beam passing through a dispersion controller 3 remains the path position or/and a light spot size during the dispersion tuning, so that a temporal pulse width can be controlled without changing the other laser parameters, to control the output spectra of the invented system and to tune the spectral peak and bandwidth of the output with a consistent output power;

S4. A redshift and blueshift tunable fiber-optic spectral conversion module 5 (spectral conversion module) receives the spectrum from the dispersion controller 3. The spectral conversion module 5 comprises a nonlinear medium for spectral broadening, and it leads to the spectral conversion of the input pulse. The redshift and blueshift after the spectral conversion module 5 can be tuned respectively towards longer wavelength and shorter wavelength; and S5. The use of a spectral selection module 6 selects the required spectral lobes and reject unnecessary light at the other wavelengths; for example, the choice of long pass and short pass filters depends on the spectra of the outmost spectral lobes: The red-shifted spectral lobes require the long pass filters with a cutoff wavelength less than the peaks of spectral lobes; the blue-shifted spectral lobes require the short pass filters with a cutoff wavelength larger than the peaks of spectral lobes. (e.g., in the case of using 1025-nm input pulse, the outmost blue-shifted spectral lobes with a spectral peak location at the wavelength of 860 nm can be selected by using a 900-nm short pass filter; the red-shift lobe with the spectral peak at the wavelength of 1110 nm can be selected by using a 1100-nm long pass filter).

In the embodiment, the output power of the selected spectral lobes can be stabilized by using an input power stabilizer before the spectral conversion module.

The present invention is regarding the method and system for generating femtosecond pulses with simultaneously tunable spectral redshift and blueshift and bandwidth, which employ the fiber-optic nonlinear conversion to implement the method and function of continuously tuning the spectral peak location without changing the output average power. The temporal pulse width and the optical intensity of the input light of the spectral conversion module 3 are manipulated continuously by introducing additional dispersion to the input pulse of the spectral conversion module 5 while maintaining the light power, and the optical intensity is proportional to the strength of SPM. The stronger SPM, leading to more nonlinear phase, results in more spectral redshift and blueshift, so as to achieve the conversion to different wavelengths. When the input temporal pulse width is changed without changing the input average power, the input peak intensity will be negatively correlated with the temporal pulse width, but the average power of the output light is mostly unchanged when the input average power is not changed, so as to implement the function of continuously modifying the wavelength without changing the output average power, as the function proposed in [0009], as shown in FIG. 5.

Figure 5:
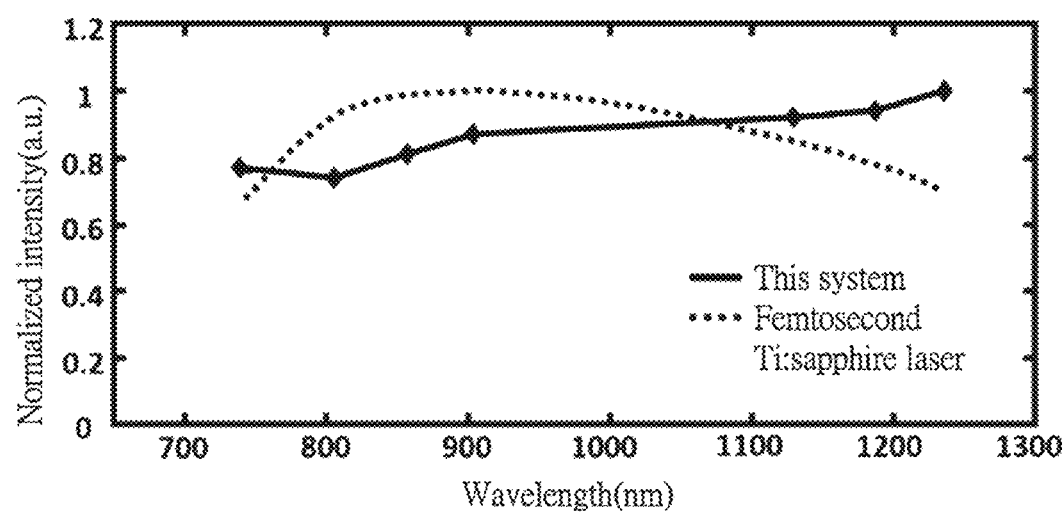
FIG. 5 Schematic diagram of wavelength tunable lobes with constant power.

A preferred embodiment of the present invention, as shown in FIG. 5, taking a photonic crystal fiber 51 as an example, the power of the filtered lobes remains consistent, and this system shows a similar power consistency with a prior art using non-fiber-based femtosecond laser system (e.g., using Ti:sapphire-based-laser system). Therefore, this system has solved the problem of a prior art, which also employs fiber-optic SPM as the spectral broadening mechanism with a poor output power consistency, leading to insufficient output power from the spectral lobes close to the driving light source wavelength, so as to achieve the function in [0009].

A preferred embodiment of the present invention, which is a method and system for generating femtosecond pulses with simultaneously tunable spectral redshift and blueshift and bandwidth, employs a fiber-optic nonlinearity (SPM effect) with the control of the introduced dispersion by the dispersion controller 3, to modify the temporal pulse width and peak intensity of the input pulse of the spectral conversion module 5, assisted by input fiber average power fine-tuning from an input power stabilizer, to achieve continuously tunable wavelength and consistent average power during tuning wavelength, as mentioned in [0009].

As stated above, the fiber-optic SPM effect is the mechanism for continuously spectral tuning, and the output effect is shown in FIG. 2: When the femtosecond optical pulses propagate in the fiber, the output spectrum broadens towards shorter and longer wavelength in comparison to the input spectrum. The spectral broadening is proportional to the peak intensity into the fiber. If the spectral broadening is generated mainly by the SPM effect, most of the spectral energy will fall in the two outmost spectral lobes (the parts in the dotted frames in FIG. 2). Then the two spectral lobes are filtered out, and the wavelength tunable light source can be achieved by modifying the input peak intensity, as shown in FIG. 5.

Preferably, the input temporal pulse width of the spectral conversion module 5 can be modified by using said two technologies (the management of the nonlinearity and the SPM effect by controlling the introduced dispersion and driving current), and the output spectral bandwidth will change. The output spectral bandwidth is negatively correlated to the input temporal pulse width.

Preferably, the present invention enables consistent, stable, and continuous tuning of the peak and bandwidth of the output spectra, as shown in FIG. 5, and the tunable light source of this system is used to simultaneously shift the wavelength towards longer wavelength and shorter wavelength from the center wavelength of the femtosecond seed laser 1 (e.g., about 1,025 nm of an ytterbium-doped fiber laser). With the management of dispersion, this technology can deliver stable output pulses with minimum power fluctuation within the adjustable range.

Preferably, the femtosecond laser source with continuously tunable wavelength of the present invention delivers high intensity short pulses (the unit of pulse duration is femtosecond: $10^{-15}$ sec).

Preferably, the output power at different tuned wavelengths from the femtosecond tunable laser source is not correlated to the blueshift/redshift amount.

A preferred embodiment of the present invention: A femtosecond laser system, with simultaneously tunable redshift and blueshift, and with a consistent output power and controllable bandwidth, and the specification is different from the prior art, non-fiber-based solid-state laser systems (e.g., Ti:sapphire lasers with optical parametric oscillators), which requires precise light path alignments with annual maintenance for professional calibration. This system employs fiber-optic technology to manipulate the output wavelength and bandwidth, which saves the costs of expensive laser elements and the needs of annual maintenance.

Preferably, the device for realizing the tuning of the spectral peak location and the bandwidth in the present invention is the spectral conversion module 5, which only requires focusing the input laser beam into the fiber, featuring a compact and low-cost design. Its integration with a femtosecond fiber laser as the femtosecond seed laser 1 may lead to a compact and low-cost solution as a tunable femtosecond source with a consistent output power.

Preferably, this system can be easily separated into different modules, and the key unit, the spectral conversion module 5, can be easily replaceable with the ease of maintenance. For example, the spectral conversion module 5 can be switched rapidly within ten minutes. Besides the replacement of a malfunctioning module, the tunable spectral range and tunable spectral bandwidth can be further expanded by using different spectral conversion modules (e.g., with different types and lengths of optical fibers as the nonlinear medium).

Preferably, this system natively features good heat sinking based on a fiber laser, and this driving light source may be free from additional temperature and humidity control, which enables the smooth operation at least at room temperature from 23 to 30° C. and humidity from 30 to 70%.

Preferably, this system is relatively tolerable to external vibration, and the influence of vibration on misalignment can be recovered by active-controlled mirrors using a feedback loop.

Preferably, this system can employ fiber laser system as the driving light source, and the light path can be all fiber-based, which leads to a better isolation to the environment perturbation. Moreover, the volume of driving light source can be reduced within one meter in length, width, and height.

Preferably, this system uses a small piece of fiber as the key component in the spectral conversion module, and its length, width, and height are about within 20 cm (even possibly smaller than 5 cm), which significantly alleviates the concern in space arrangement.

Preferably, this system may use different spectral conversion modules 5 to achieve better energy conversion efficiency compared to the prior arts, and the tunable spectral range can be tuned towards longer and shorter wavelengths simultaneously, which enables larger than 30% of total fiber output energy of the continuously tunable filtered lobes in both redshift and blueshift.

A preferred embodiment of the present invention: An electric translational stage, as shown in FIG. 7, is used in the dispersion controller 3, and a driving current controller 2 controls a pump laser diode 21 in the femtosecond seed laser 1 to manipulate the output spectrum. An optical grating pair is employed in the dispersion controller 3 in this embodiment, but other dispersive components can also be used. An electric control system 7 of the electric translational stage controls the distance between two gratings, so as to manipulate the introduced dispersion and change the input temporal pulse width of the spectral conversion module 5. The spectral broadening is enabled by the coupled input light into a photonic crystal fiber 51, so as to control the range of a tunable wavelength and a tunable bandwidth from the spectral conversion module 5 (the input beam in the figure is indicated as the dash-dotted line), and the output light after the photonic crystal fiber 51 is a tunable broadened spectra. The required spectra of the output pulse are selected by a spectral selection module 6; a polarization beam splitter can be employed before the redshift and blueshift tunable fiber-optic spectral conversion module 5 to control the input power and polarization.

Figure 8:
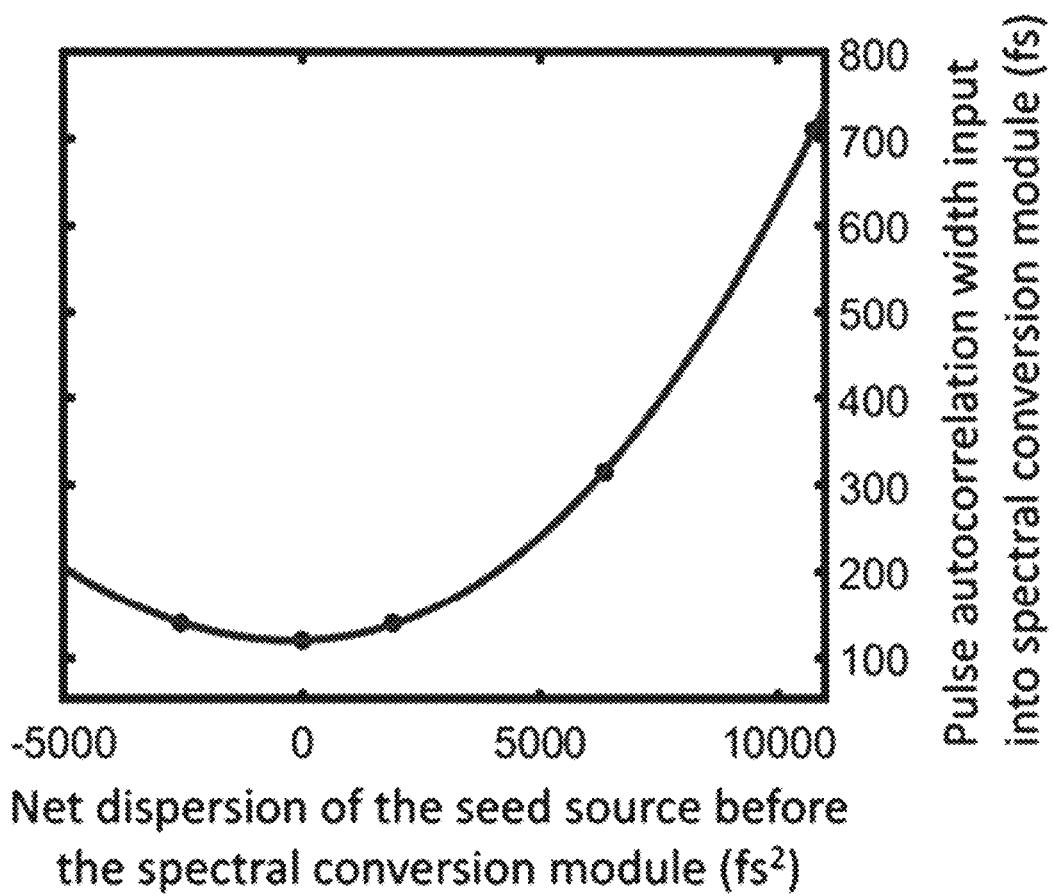
FIG. 8 Schematic diagram of controllable input temporal width.

The dispersion controller 3 mainly provides tunable group delay dispersion (GDD, unit: $fs^2$) to the input pulse of the spectral conversion module 5. The net GDD of the input pulse includes the dispersion provided by the dispersion controller and the intrinsic chirp from the output of the femtosecond seed laser 1, the smaller absolute value of the net GDD leads to the shorter pulse width (unit: femtosecond (fs)) and stronger SPM during the nonlinear propagation inside the spectral conversion module 5. Stronger SPM results in more spectral broadening and more redshift/blueshift. The embodiment is shown in FIG. 8, which applies a simple prism pair or transmission/reflection grating pair as an example, and the dispersion controller 3 modifies the net GDD amount by controlling the distance between the dispersive elements, so as to manipulate the temporal pulse width into the spectral conversion module. The longer the distance between two prisms leads to the larger negative GDD, and the smaller absolute value of net GDD leads to the shorter temporal pulse width, which leads to stronger SPM during the nonlinear conversion in the spectral conversion module 5 for the larger redshift/blueshift.

Preferably, this system delivers a light source, featuring continuously tunable blue-shifted and red-shifted spectra with consistent output power, enabled by fiber-optic SPM effect in the spectral conversion module and controlled by the dispersion controller 3 and the driving current controller 2. This method enables simultaneously redshift and blueshift with a wide tuning range. The shifted spectral peak location under different chirp is shown in FIG. 3, and the tuned spectra are indicated in different colors in FIG. 4. The output energy after the spectral selection module 6 is mostly concentrated in the two outmost (red-shifted and blue-shifted) spectral lobes, so as to realize a high energy conversion efficiency. It can be clearly noticed that the output powers of the different tuned spectra (e.g., the colors of spectral lobes shifted to the longer wavelength and shorter wavelength in FIG. 4) are roughly the same, as shown in FIG. 5 with less than 20% of the variation.

As stated above, the present method uses the dispersion controller 3 and the driving current controller 2 to control the chirp of the pulses and the temporal pulse width, so as to achieve different spectral broadening effects. The less net dispersion leads to shorter temporal pulse width into the spectral conversion module 5, and the stronger nonlinearity during the nonlinear conversion in the spectral conversion module 5 leads to a wider range of spectral broadening.

Figure 4:
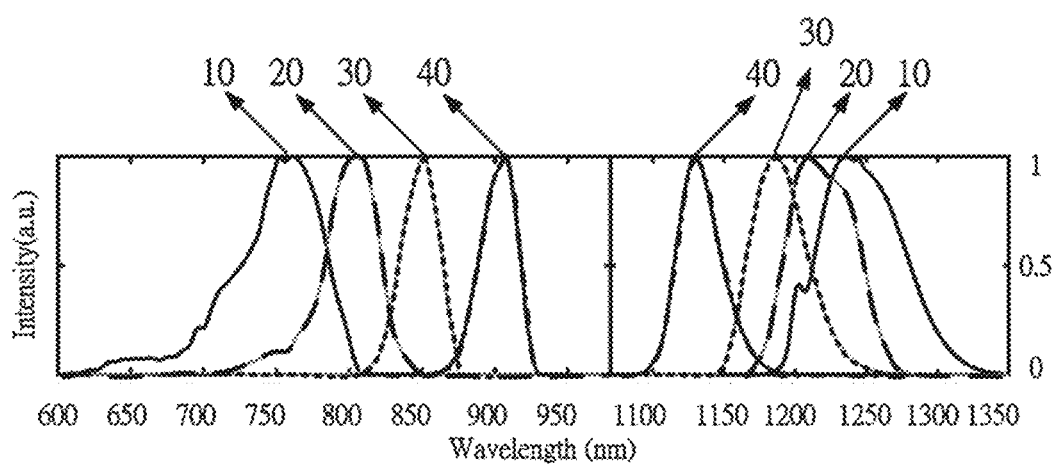
FIG. 4 Schematic diagram of spectral lobes filtered from the spectral broadening.

As stated above, the spectral selection module 6 includes long-pass and short-pass filter plates or band pass filter plates, and the spectral lobes are filtered out, as the spectra shown in FIG. 4, from the continuously tunable spectrum, as shown in FIG. 2. The tunability of the spectral peak location under different introduced chirp is shown in FIG. 4. The spectral lobes with the same color in FIG. 4 are the blue-shifted and red-shifted lobes from the same broadened spectrum, which can be filtered out simultaneously or individually.

Preferably, the dispersion controller 3 and the driving current controller 2 can be applied together or individually to generate different red/blueshift spectra with consistent power from the spectral conversion module 5 (definition of "consistent": difference between the maximum and minimum power is less than 40%) or to generate the tunable spectral bandwidth, with 20% difference between the broadest and narrowest bandwidths.

Embodiment 3

Another embodiment of the present invention: A method and system to deliver femtosecond pulses with simultaneously tunable spectral redshift and blueshift and bandwidth, which enables tuning the spectral bandwidth at specific spectral peaks, and the bandwidth tuning method can be achieved with the following steps:

A1. A femtosecond seed laser 1 generates femtosecond laser pulses;

A2. A driving current controller 2 controls the output power and spectrum of the femtosecond seed laser 1, so as to control the fiber-optic nonlinear effect and to manipulate the output spectrum and pulse shapes;

A3. The laser beam passing through a dispersion controller 3 fixes the path position or/and a light spot size during the dispersion tuning, so that a temporal pulse width can be controlled without changing the other laser parameters, to control the output spectra of the invented system and to tune the spectral peak location and bandwidth of the output;

A4. An input power stabilizer 4 regulates the optical power input into a redshift and blueshift tunable fiber-optic spectral conversion module 5 (spectral conversion module), in order to fix the light path or/and the light spot size and to stabilize the power and spectrum of the output pulse, and it can cooperate with the dispersion controller 3 and the driving current controller 2 to control the peak intensity and the duration of the input pulse of the spectral conversion module 5;

A5. The spectral conversion module 5 receives optical pulses, and the duration and peak power of the input pulse can be controlled by the dispersion controller 3, the driving current controller 2, and the input power stabilizer 4: By controlling the introduced net dispersion and input power to manipulate the pulse width and peak intensity of the input pulse, a certain amount of input peak intensity corresponds a specific tuned spectral peak under a specific dispersion value, and the bandwidth of the spectral lobe is negatively correlated to the input pulse width, realizing the effect of [0010].

A6. A spectral selection module 6 selects the required spectral lobes and rejects unnecessary light of the residual wavelengths.

Figure 9:
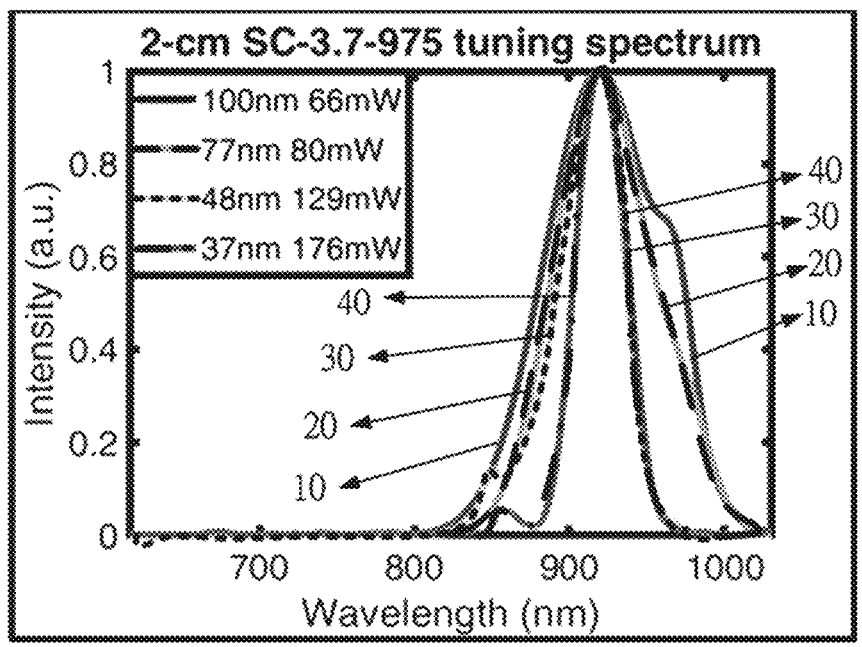
FIG. 9 Output spectra with tunable bandwidth and corresponding output power under a certain peak wavelength.
Figure 9:
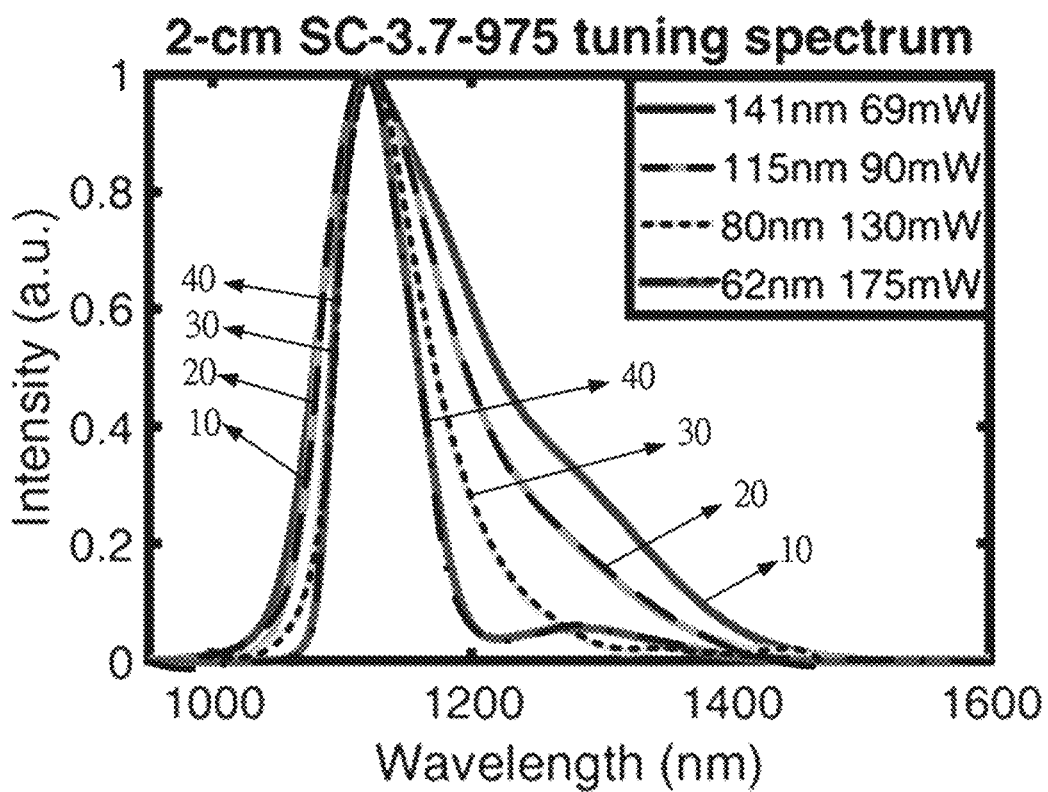

In the embodiment, the temporal pulse width and average power of the input light before the spectral conversion module 5 can be modified under a fixed input peak intensity (i.e., peak power under a unit area) by using the dispersion controller 3, the driving current controller 2, and the input power stabilizer 4, and the spectral peak location of the output can thus remain constant. However, the spectral bandwidth changes when varying input pulse widths, as the characteristics proposed in [0010]. For example, with more dispersion added, the input pulse becomes wider in the time domain, requiring higher input power to maintain the same center wavelength, leading to narrower output spectral and width from the spectral conversion module 5, delivering higher output power, as shown in FIG. 9.

Figure 6:
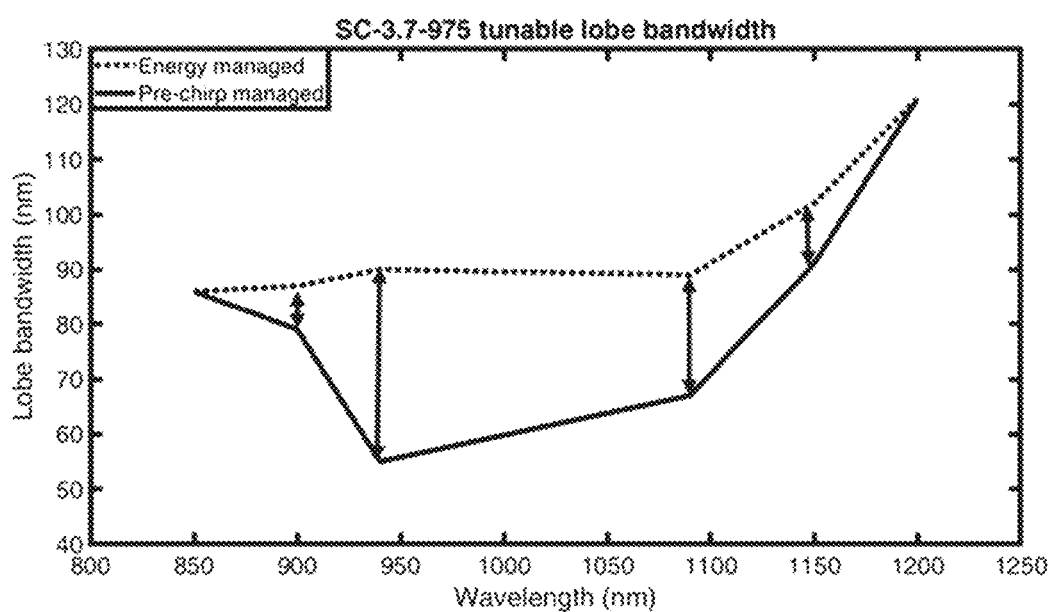
FIG. 6 Schematic diagram of tunable lobe bandwidth.

Preferably, the main factors to control the output peak location of the spectral lobe are the power and temporal pulse width of the input pulse before the spectral conversion module 5. The different combinations of input power and temporal width lead to the spectral lobes with the same peak location but with different bandwidths, as shown in FIG. 6. The dispersion controller 3, the driving current controller 2, and the input power stabilizer 4 can be used simultaneously as the tuning degree of freedom, which enables the simultaneously tunable wavelength and bandwidth of output pulses to achieve the effect mentioned in [0010]. Using the spectral conversion module 5 (e.g., in the same species and length of photonic crystal fiber 51) to achieve a specific peak location of the output spectrum, the shorter input temporal pulse corresponds to a larger output spectral bandwidth with a lower output power, as shown in FIG. 9. To illustrate, a piece of SC-975 photonic crystal fiber is used, and the full width at half maximum of the output spectral lobe at different tuned wavelengths is managed by the input chirp (the solid line) and coupled energy (the dotted line), as shown in FIG. 6. The bandwidth range between the two management methods at a specific spectral peak is the applicable tuning range of the spectral bandwidth at the specific wavelength, and the range is indicated with double arrows. This tunable bandwidth can be customized by users to achieve tunable spectral bandwidth and temporal pulse width at different wavelengths; additionally, the range of tunable wavelength, output power, and tunable spectral bandwidth can be further expanded by using different spectral conversion modules 5 (e.g., changing the species and length of the optical fiber).

An embodiment of the present invention: The spectral conversion module applies the SPM effect in the fiber to generate broadened spectrum, which differs from the input spectrum. The spectral conversion module 5 may include one or more than one piece of fibers, which can be switched to different species and lengths.

Preferably, the amount of the tunable spectral redshift/blueshift from the same spectral conversion module 5 is proportional to the input pulse peak power, and it is negatively correlated to the input temporal pulse width; the output bandwidth is negatively correlated to the input pulse width of the spectral conversion module 5.

The invention claimed is:

1. A system to simultaneously generate tunable redshift and blueshift femtosecond laser pulses with adjustable spectral bandwidth and output power, controlled with fiber-optic nonlinearity for continuous spectral manipulation, and the system comprises:
    a femtosecond seed laser generates the femtosecond laser pulses;
    a driving current controller, connected to the femtosecond seed laser, and the driving current controller controls the output power and a spectrum of the femtosecond seed laser;
    a dispersion controller, connected to the femtosecond seed laser, and the dispersion controller varies introduced dispersion to control a temporal pulse width of the femtosecond laser pulses, while maintaining a beam position or/and a light spot size of the femtosecond laser pulses, to achieve tuning of a peak and a bandwidth of output spectral lobes;
    a spectral conversion module, connected to the dispersion controller, wherein the spectral conversion module comprises a nonlinear medium for spectral broadening, the spectrum of the femtosecond seed laser is converted and broadened through the spectral conversion module; the redshift and blueshift is tuned towards longer wavelength and shorter wavelength respectively; and
    a spectral selection module, connected to the spectral conversion module, wherein the spectral selection module selects an outmost lobes of a broadened spectra and rejects the femtosecond laser pulses at other wavelengths.

2. The system to simultaneously generate tunable redshift and blueshift femtosecond laser pulses with adjustable spectral bandwidth and output power defined in claim 1, wherein the dispersion controller comprises a translational stage, and a distance or transmission thickness of a dispersion control component is regulated electrically or manually to control the introduced dispersion.

3. The system to simultaneously generate tunable redshift and blueshift femtosecond laser pulses with adjustable spectral bandwidth and output power defined in claim 1, wherein the spectral conversion module employs a self-phase modulation (SPM) effect in a fiber to generate broadened spectrum, so that an output spectrum is different from an input pulse spectrum; the spectral conversion module comprises one or more than one fiber.

4. The system to simultaneously generate tunable redshift and blueshift femtosecond laser pulses with adjustable spectral bandwidth and output power defined in claim 1, wherein the spectral selection module comprises manually or/and automatically switchable optical filter plate, with transverse or/and rotary motion modes or with a resonance tunable material to select and filter out the outmost spectral lobes of the broadened spectra.

5. The system to simultaneously generate tunable redshift and blueshift femtosecond laser pulses with adjustable spectral bandwidth and output power defined in claim 1, wherein the driving current controller assists the dispersion controller to manipulate an input peak power and a temporal pulse shape into the spectral conversion module.

6. A method to simultaneously generate tunable redshift and blueshift femtosecond laser pulses with adjustable spectral bandwidth and output power to optimize an output spectral bandwidth or the output power, comprising:
    S1. a femtosecond seed laser generates femtosecond laser pulses;
    S2. a driving current controller sends control signals to the femtosecond seed laser and regulates the output power, a temporal pulse width, or a spectrum of the femtosecond laser pulses;
    S3. a dispersion controller provides dispersion to the spectrum of the femtosecond laser pulses, and thus controls the temporal pulse width and a peak intensity of the femtosecond laser pulses, while maintaining a beam position or/and a light spot size of the femtosecond laser pulses, so as to tune output spectral lobes;
    S4. a spectral conversion module takes the spectrum after the dispersion controller as an input, and the spectral conversion module comprises a nonlinear medium for spectral broadening; the redshift and blueshift of the spectral broadening is simultaneously tuned by the dispersion controller and the driving current controller; and
    S5. a spectral selection module selects outmost spectral lobes of a broadened spectra and remove the femtosecond laser pulses at other wavelengths.

7. The method to simultaneously generate tunable redshift and blueshift femtosecond laser pulses with adjustable spectral bandwidth and output power defined in claim 6, wherein the spectral conversion module implements the method to continuously vary the outmost spectral lobes of the broadened spectrum or precisely tune to an optimum spectrum; an output average power after the spectral selection module is not proportional to an amount of blueshift or redshift.

8. The method to simultaneously generate tunable redshift and blueshift femtosecond laser pulses with adjustable spectral bandwidth and output power defined in claim 6, wherein the spectral conversion module, assisted with the control of an input average power, implements the method to continuously vary the outmost spectral lobes of the broadened spectrum or to precisely tune to an optimum spectrum without changing an output average power after the spectral selection module.

9. The method to simultaneously generate tunable redshift and blueshift femtosecond laser pulses with adjustable spectral bandwidth and output power defined in claim 6, an amount of the redshift/blueshift, from the spectral conversion module using a same fiber, is proportional to an input pulse peak power and is negatively correlated to an input temporal pulse width, and a filtered spectral bandwidth after the spectral selection module is negatively correlated with an input pulse width.

10. The method to simultaneously generate tunable redshift and blueshift femtosecond laser pulses with adjustable spectral bandwidth and output power defined in claim 6, wherein the step S3 comprises that:
    an input power stabilizer controls an input peak power into a spectral conversion module, the input the temporal pulse width is varied with an cooperation with the dispersion controller and the driving current controller, in order to control the bandwidth of the output spectral lobes.

11. The method to simultaneously generate tunable redshift and blueshift femtosecond laser pulses with adjustable spectral bandwidth and output power defined in claim 10, wherein the input peak power is controlled before the spectral conversion module, in order to obtain a specific spectral peak location of output pulses, and the control of input temporal pulse width at the same time leads to a tunable output spectral bandwidth at the specific peak location; the output spectral bandwidth is negatively correlated to the input temporal pulse width, an input average power, and an output average power.

* * * * *